United States Patent
Hagiwara

(10) Patent No.: US 6,684,707 B2
(45) Date of Patent: Feb. 3, 2004

(54) VIBRATION MEASURING METHOD, BALANCE CORRECTING METHOD, AND INFORMATION RECORDING AND/OR REPRODUCING APPARATUS

(75) Inventor: Hiroyuki Hagiwara, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 137 days.

(21) Appl. No.: 09/938,562

(22) Filed: Aug. 27, 2001

(65) Prior Publication Data

US 2002/0046607 A1 Apr. 25, 2002

(30) Foreign Application Priority Data

Aug. 30, 2000 (JP) ........................................ 2000-260080

(51) Int. Cl.[7] ........................... G11B 19/20; G11B 15/46
(52) U.S. Cl. ........................................ 73/660; 369/53.1
(58) Field of Search ........................... 73/593, 660, 659; 360/73.03, 73.01, 75; 369/53.1

(56) References Cited

U.S. PATENT DOCUMENTS 5,521,772 A * 5/1996 Lee et al. ...................... 360/75
5,636,193 A * 6/1997 Ohmi ........................ 369/53.42
5,936,787 A * 8/1999 Ohmi ........................ 360/73.03

OTHER PUBLICATIONS

U.S. patent application Ser. No. 09/156,491, filed Sep. 18, 1998.

* cited by examiner

Primary Examiner—Hezron Williams
Assistant Examiner—Rose M. Miller
(74) Attorney, Agent, or Firm—Fitzpatrick, Cella, Harper & Scinto

(57) ABSTRACT

To correct the rotational balance of a spindle motor for rotating a disc on a base, a position and an amount of offset for correcting dynamic balance are determined from a position deviation signal, which is obtained from vibration transmitted to a rotary type position control unit located on the base similarly by lowering the servo gain thereof, and an index signal from the spindle motor. With this arrangement the dynamic balance of the spindle motor of an information recording/reproducing apparatus can be simply and accurately corrected without adding an accelerator sensor and the like.

4 Claims, 4 Drawing Sheets

HEAD MOUNTING/DISMOUNTING POSITION

VIBRATION MEASURING METHOD, BALANCE CORRECTING METHOD, AND INFORMATION RECORDING AND/OR REPRODUCING APPARATUS

BACKGROUND OF THE INVENTION

1. Field of the Invention

The present invention relates to a vibration measuring method, a balance correcting method, and an information recording and/or reproducing apparatus that can be preferably used in a magnetic and electric characteristic inspection apparatus for the servo track writer, the head, the head gimbal assembly, and the head stack assembly of a hard disc drive as well as in a magnetic or electric characteristic inspection apparatus, and the like for a hard disc itself and further also can be preferably used in an inspection and manufacturing apparatus for an optical or magneto-optical recording head and an optical or magneto-optical recording disc.

2. Description of the Related Art

FIG. 1 shows an arrangement of a conventional information recording/reproducing apparatus in which a spindle motor 102 is fixed on a base 101 to drive a disc D. A head H is mounted at the extreme end of the rotating shaft of a rotary type positioning controller 103 through a head fixing jig 104. The rotary type positioning controller 103 is supported by an X-stage 105 that is free to reciprocate on the base 101 in an X-axis direction shown by an arrow.

The distance between the center of the disc D and the center of rotation of the head H can be arbitrarily adjusted by moving the X-stage 105. When a disc replacing job is executed, the rotary type positioning controller 103 moves in a direction where it is apart from the disc D and the spindle motor 102.

The drive unit of the spindle motor 102 I\s composed of a motor unit 102a for driving the spindle motor 102 and an encoder 102b for detecting a rotational angle and outputting one pulse each one rotation. As shown in FIG. 2, the rotation of the spindle motor 102 is controlled through a spindle driver 112 in response to a command signal from a CPU 111. The rotational shaft of the spindle motor 102 holds the disc D by a clamp 107 on a clamp base 106 and is rotatably supported by an air bearing 108.

The drive unit of the rotary type positioning controller 103 also is composed of a motor unit 103a and an encoder 103b for detecting a rotational angle and connected to the CPU 111 through a servo controller 113.

When information is recorded and reproduced, the X-stage 105 is moved in the X-axis direction from the position shown in FIG. 1 to cause the rotary type positioning controller 103 to approach the spindle motor 102, the rotary type positioning controller 103 is rotated by driving the motor unit 103a, the head H is positioned on an arbitrary track on the disc D, and then the spindle motor 102 starts to be driven.

When the vibration of the spindle motor 102 is measured and the balance thereof is corrected, an A/D converter 114, an acceleration sensor 115 such as an acceleration sensor or the like and the amplifier 116 of the acceleration sensor 115 are mounted on the base 101 and connected to the CPU 111 through a PC 111a. As shown in FIG. 1, the acceleration sensor 115 is mounted in the vicinity of the spindle motor 102.

The CPU 111 issues a command for starting the rotation of the spindle motor 102 and thereafter starts measurement by the acceleration sensor 115. The encoder 102b of the spindle motor 102 generates one pulse per one rotation and determines a position of the spindle motor 102 where its rotation is unbalanced. This unbalance is corrected by a known method.

According to the above conventional technology, however, the acceleration sensor and the like must additionally be mounted on the apparatus as described above to measure vibration and to correct balance.

SUMMARY OF THE INVENTION

The present invention, which was made in view of the unsolved problems of the conventional technology, is to a provide a vibration measuring method, a balance correcting method, and information recording and/or reproducing apparatus capable of measuring the unbalance of rotating units such as a spindle motor and the like at a pinpoint accuracy and correcting it without the need of an accelerator sensor and the like.

Further objects, features and advantages of the present invention will become apparent from the following description of the preferred embodiments with reference to the attached drawings.

DESCRIPTION OF THE PREFERRED EMBODIMENTS

In the embodiment described below, vibration, which is transmitted from rotational units such as a spindle motor unit and the like to a rotary type position control unit (position control means) through a base, is detected as a position deviation signal from the output of the encoder of the rotary type position control unit without adding an accelerator sensor and the like on a base in order to correct the dynamic balance of the rotational units. The position deviation signal is approximated to the waveform of a sine wave and displayed on a monitor screen, the unbalanced position of the rotational unit and the amount of offset thereof are determined, and the unbalance is corrected by a dynamic balance correcting mean such as set screws or the like previously disposed to a rotational unit.

Since the dynamic balance is corrected using the position deviation signal of the rotary type position control unit and the index signal from the rotational unit, unbalanced rotation can be very accurately measured and corrected by a simple, easy and less expensive method.

An embodiment of the present invention will be described below based on FIGS. 3 to 5.

Figure 1:
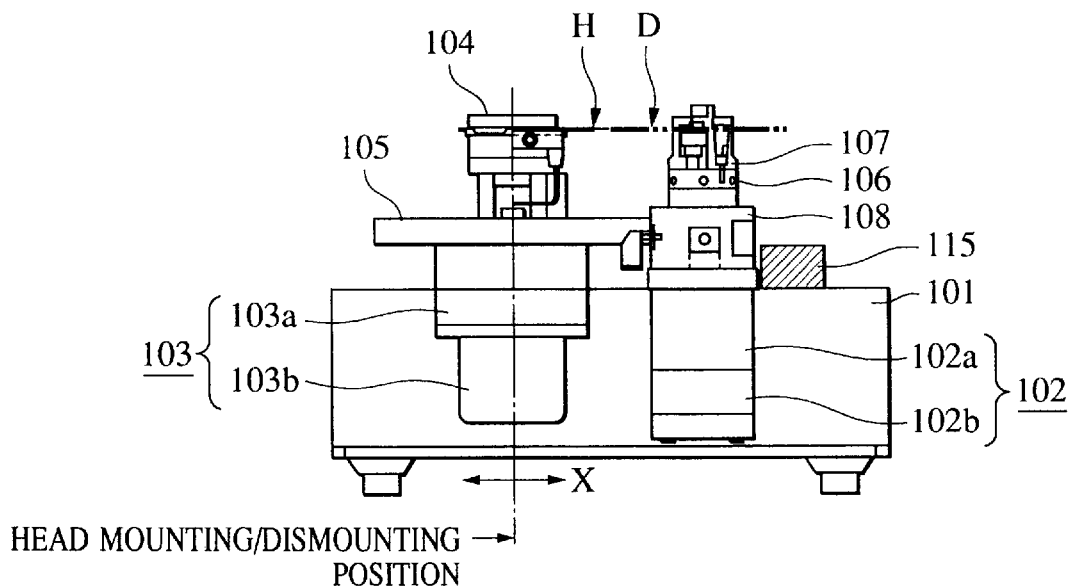
FIG. 1 is a schematic elevation showing a information recording/reproducing apparatus according to a conventional example.
Figure 2:
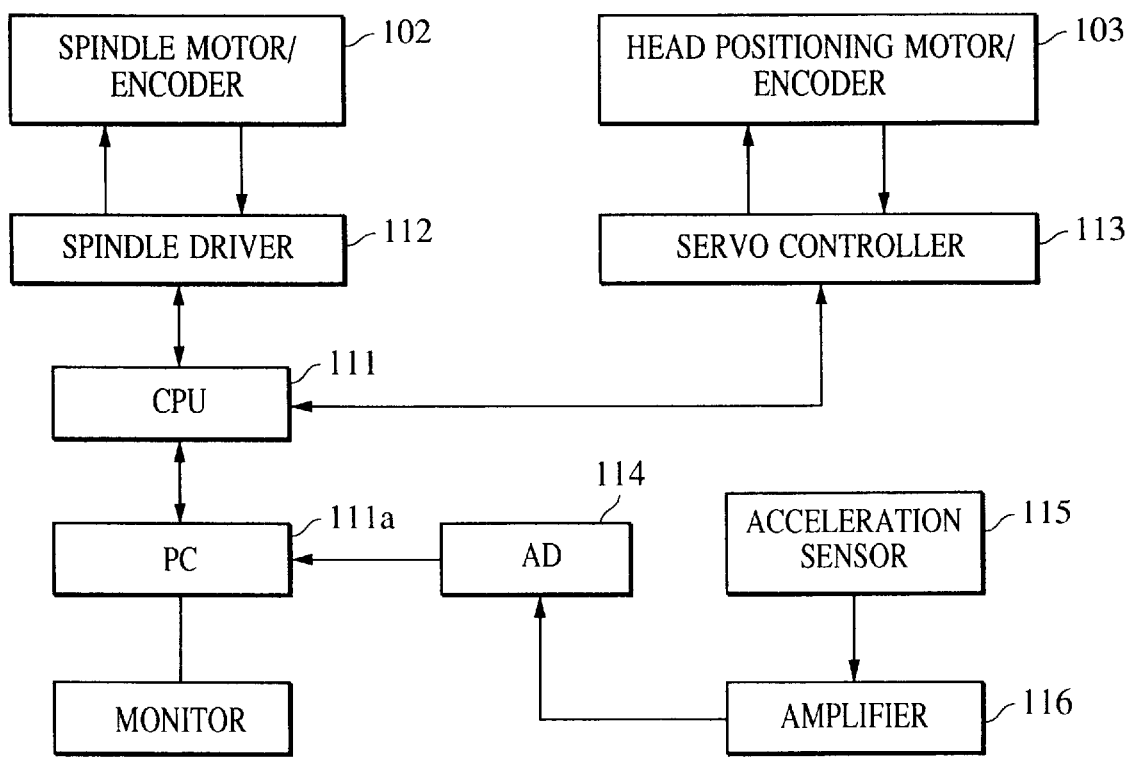
FIG. 2 is a block diagram showing the controller of the apparatus of FIG. 1.
Figure 3:
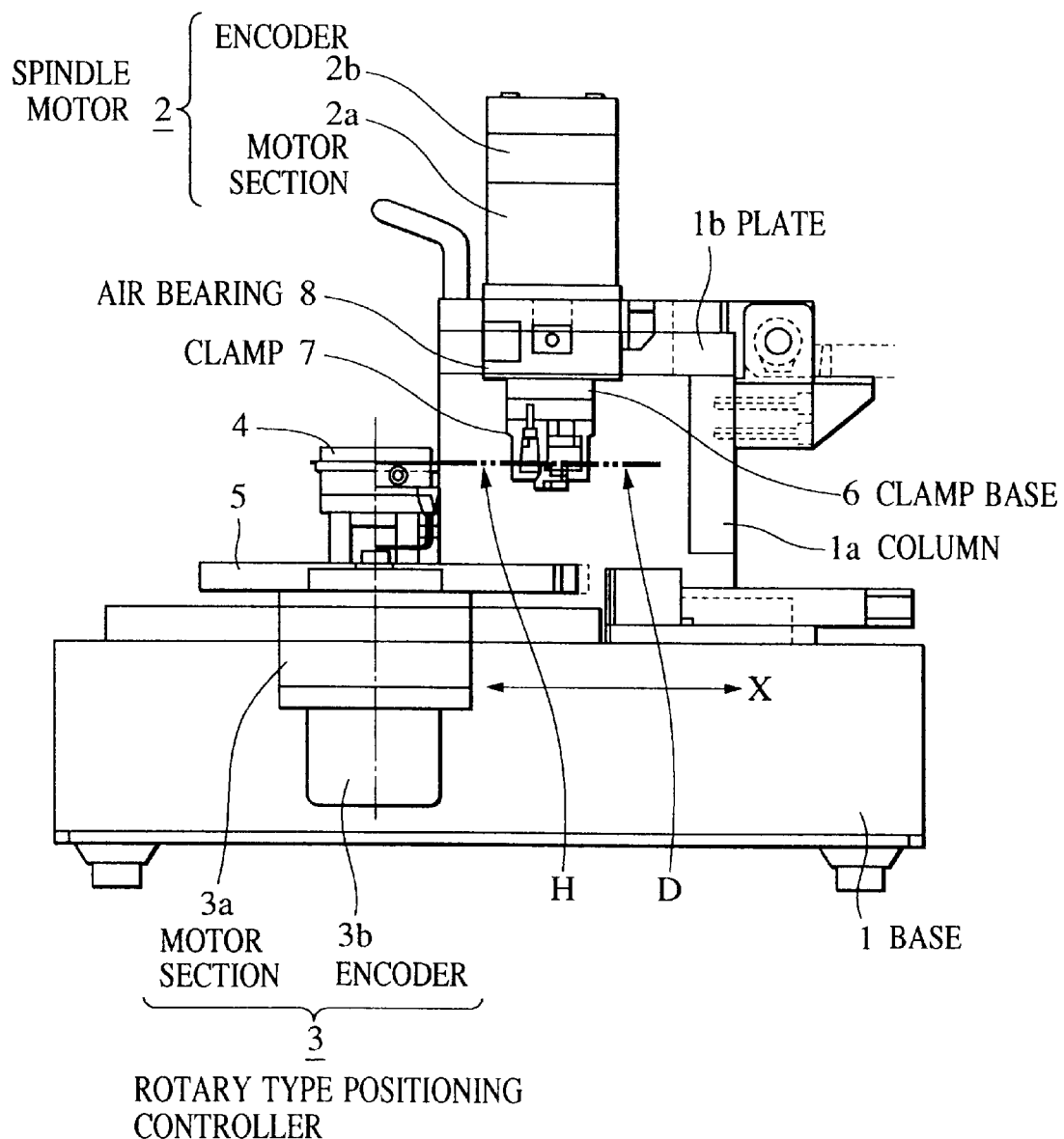
FIG. 3 is a schematic elevation showing an information recording/reproducing apparatus according to an embodiment.
Figure 4:
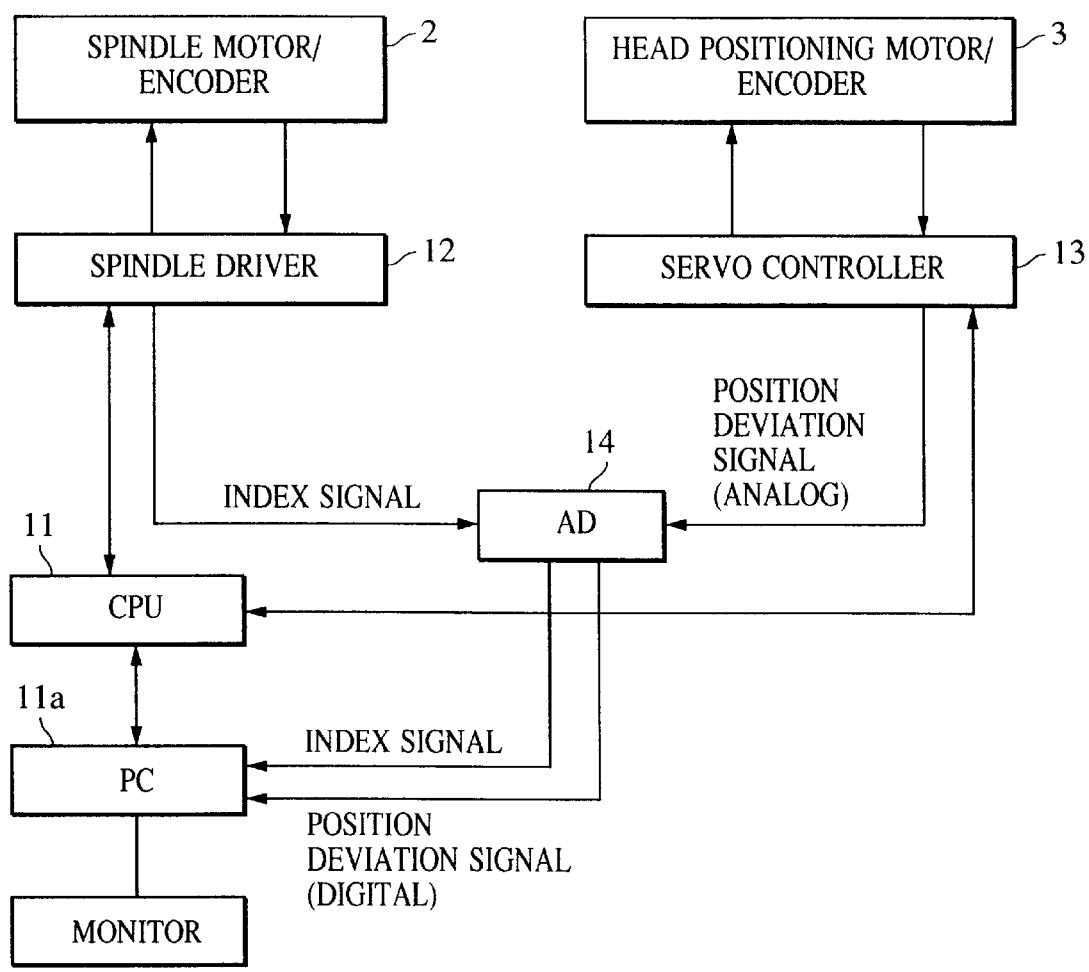
FIG. 4 is a block diagram showing the controller of the apparatus of FIG. 3.

FIG. 3 shows an information recording/reproducing apparatus of the present invention. Note that while this embodiment will be described below as an apparatus capable of both recording and reproducing information to and from a disc through a head, the apparatus may only read or record information (when a means for positioning a head to a track is separately provided).

A spindle motor 2 is fixed on a base 1 to drive a disc D. A head H acting as a unit to be positioned is mounted at the extreme end of the rotational shaft of a rotary type position controller 3 acting as the position control means (rotary type position control unit) through a head fixing jig 4. The rotary type position controller 3 is supported by an X-stage that is free to reciprocate on the base 1 in the X-axis direction shown by an arrow.

The distance between the center of the disc D and the center of rotation of the head H can arbitrarily be adjusted by moving the X-stage 5. When a disc is replaced, the rotary type position controller 3 moves in a direction where it is apart from the disc D and the spindle motor 2.

The drive unit of the spindle motor 2 is composed of a motor unit 2a for driving the spindle motor 2 and an encoder 2b for detecting a rotational angle and outputting one pulse each one rotation. As shown in FIG. 4, the rotation of the spindle motor 2 is controlled through a spindle driver 12 in response to a command signal from a CPU 11. The rotating shaft of the spindle motor 2 holds the disc D by a clamp 7 supported by a clamp base 6 and is rotatably supported by an air bearing 8.

The drive unit of the rotary type position controller 3 also is composed of a motor unit 3a and an encoder 3b acting as a means for detecting a rotational angle and obtaining rotation information and connected to the CPU 11 through a servo controller 13. The servo controller 13 is arranged to position the head H at a predetermined track position designated by the CPU 11 from the servo signal which the head H reads from the disc D and the head displacement signal of high resolution from the encoder.

When information is recorded and reproduced, the X-stage 5 is moved in the X-axis direction to cause the rotary type position controller 3 to approach the spindle motor 2, the rotary type position controller 3 is rotated by driving the motor unit 3a, the head H is positioned on an arbitrary track on the disc D, and then the spindle motor 2 starts to be driven. A signal processor (not shown) writes information to or reads information from the track through the head H in this state.

When the vibration of the spindle motor 2 is measured and the balance thereof is corrected, a PC 11a transfers a parameter for measuring vibration and correcting balance, the servo gain of which is sufficiently lowered than that when information is read and reproduced, to the CPU 11.

Thereafter, the rotary type position controller 3 is driven so that the result of detection of the encoder 3b is fixed to a specific rotational position, and thereafter the spindle motor 2 is rotated. This specific position to be fixed is a target position.

When the spindle motor 2 rotates, it is vibrated by the unbalance of an overall rotary body including the disc D acting as the rotating unit (spindle motor unit) the clamp 7, the clamp base 6, the rotating shaft of the spindle motor 2, and the like, and the vibration of the spindle motor 2 is transmitted to the encoder 3b of the rotary type position controller 3 through a plate 1b on which the spindle motor 2 is fixed, a column 1a, the base 1, and the X-stage 5. This vibration information is measured by the signal outputted from the encoder 3b.

That is, while the disc and the encoder also are vibrated by the vibration transmitted at this time, the position of the head H is dislocated from a target position where it is to be positioned by lowering the servo gain. While the rotary type position controller 3 executes control to restore this dislocation, the target position and an actual amount of dislocation are outputted from the encoder 3b as a position deviation signal.

The encoder 3b outputs the position deviation signal as an analog signal through the servo controller 13 of the rotary type position controller 3. An A/D converter 14 detects the position deviation signal and converts it into a digital signal, and the PC 11a captures the digital position deviation signal. The encoder 2b in the spindle motor 2 generates an index signal of one pulse each one rotation, and the PC 11a also captures this index signal through the A/D converter 14.

Figure 5:
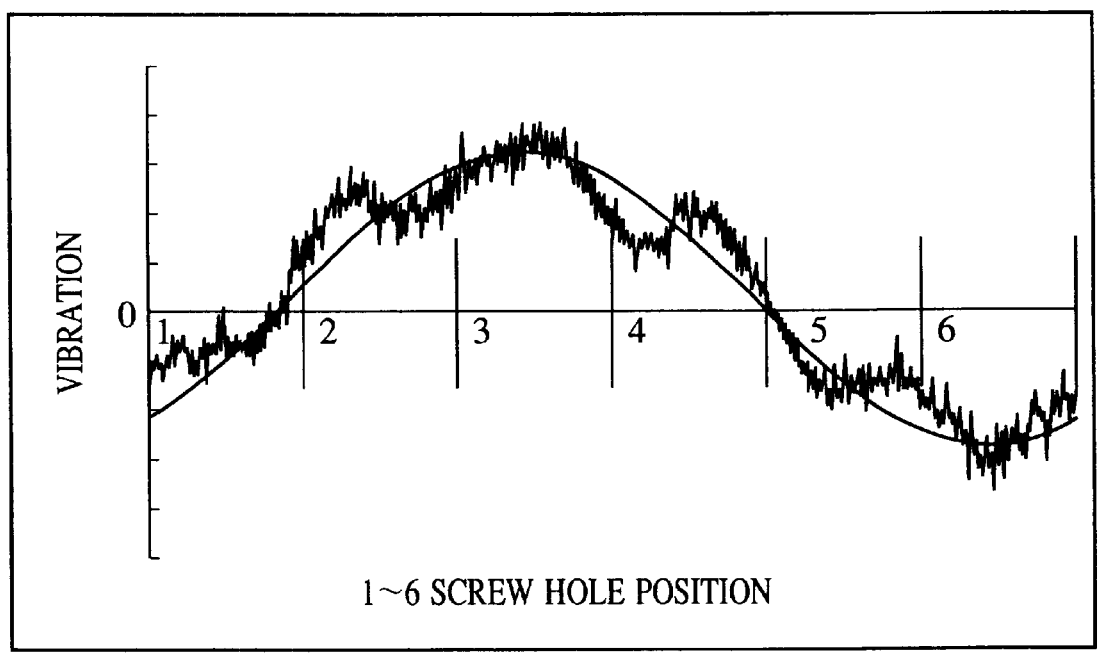
FIG. 5 is a view showing a graph of a position deviation signal shown on the monitor screen of a PC of FIG. 3.

FIG. 5 is a graph showing the above-mentioned on the PC 11a. The graph shows the position deviation signal of the one rotation by subjecting the signal to averaging processing using the index signal as a reference.

Six screw holes are formed through a side of the clamp 7 of the spindle motor 2, set screws acting as a dynamic balance correcting means are inserted into these screw holes and the positions thereof are adjusted, thereby correcting so-called dynamic balance for correcting balance.

The numerals 1–6 of the horizontal axis of the graph of FIG. 5 show the positions of the screw holes for correcting balance. Vibration due to unbalance and data obtained by approximately fitting to the vibration are shown on the monitor screen of the PC 11a. As a result, how many times and in what direction the set screw in the screw hole at a particular position is to be rotated is calculated and displayed on the screen.

To describe in more detail, the position deviation signal for one rotation from the servo controller 13 of the rotary type position controller 3 the servo gain of which is lowered is outputted to the monitor screen as shown in FIG. 5. The two points of the deviation representing the maximum value and the minimum value are determined and approximated to the waveform of a sine wave, and the amounts of offset of the set screws in the respective screw holes 1–6 are determined from the waveform of the sine wave to correct the unbalance.

With the above arrangement, vibration can be measured and balance can be corrected simply and accurately at a lower cost by the use of the positioning information of the positioning controller without adding an accelerator sensor and the like for measuring vibration.

That is, since the information recording and/or reproducing apparatus can measure vibration making use of the output from the encoder that is used to control the rotational position of the rotational position controller of the head, dynamic balance can be excellently corrected by measuring vibration correctly at a lower cost, whereby the accuracy of recorded and/or reproduced information can be finally improved.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An information recording and/or reproducing apparatus, comprising:
   a spindle motor unit for rotating an information recording disc;
   a rotary position control unit for determining the rotational position of a head with respect to the disc, said rotary position control unit comprising a motor unit for rotating said rotary position control unit and an encoder for detecting the rotational angle of said rotary position control unit to determine the rotational position of said rotary position control unit; and
   a processing unit for obtaining vibration information of said spindle motor unit from the output of said encoder.

2. An information recording and/or reproducing apparatus according to claim 1, wherein said rotary position control unit comprises a servo controller for controlling rotation and said servo controller can set a servo gain for measuring vibration.

3. An information recording and/or reproducing apparatus according to claim 1, further comprising dynamic balance correction means disposed in the peripheral direction of said spindle motor.

4. An information recording and/or reproducing apparatus according to claim 1, further comprising a second encoder for obtaining the rotation information of said spindle motor, wherein an unbalanced position and rotational balance correcting information of said spindle motor unit are obtained from the output of said second encoder and the rotation information.

* * * * *

UNITED STATES PATENT AND TRADEMARK OFFICE
CERTIFICATE OF CORRECTION

PATENT NO.    : 6,684,707 B2
DATED         : February 3, 2004
INVENTOR(S)   : Hiroyuki Hagiwara It is certified that error appears in the above-identified patent and that said Letters Patent is hereby corrected as shown below:

Column 1,
Line 39, "each one" should read -- per --.

Column 2,
Line 13, "to a" should read -- to --;
Line 27, "showing a" should read -- showing an --; and
Line 55, "mean" should read -- means --.

Column 4,
Line 17, "one" should read -- single --.

Signed and Sealed this

Thirty-first Day of August, 2004

JON W. DUDAS
*Director of the United States Patent and Trademark Office*